United States Patent Office 3,598,777
Patented Aug. 10, 1971

---

3,598,777
SOLUTIONS OF POLYETHYLENIMINE AND THE REACTION PRODUCT OF Ti, Zr, AND Hf CHLORIDES WITH TRIMETHYL BORATE, AND SUBSTRATES COATED THEREWITH
Robert C. Wade, Ipswich, Mass., assignor to Ventron Corporation, Beverly, Mass.
No Drawing. Filed May 9, 1969, Ser. No. 823,483
Int. Cl. B32b *17/10;* C08g *23/12, 49/00*
U.S. Cl. 260—29.2                 19 Claims

ABSTRACT OF THE DISCLOSURE

This invention provides solutions in water or an alcohol containing not more than four carbon atoms of the reaction product of trimethyl borate with the chloride of a metal selected from Ti(IV), Zr(IV) and Hf(IV) and (1) a polymer of ethylene imine having a molecular weight between about 600 and 100,000 or (2) the reaction product of ethylene oxide with a polyethylenimine having a molecular weight between about 40,000 and 60,000. These solutions are useful for coating anionic material, such as glass, clay, silica, cellulose and leather to form a water insoluble coating when dried. Rubber reinforcing clays treated with these solutions show marked improvement in their rubber reinforcing qualities.

---

This invention relates to highly useful solutions in an alcohol containing not more than four carbon atoms, such as methanol, ethanol, primary or secondary propyl alcohol, and the butyl alcohols, but preferably water, of the reaction product of trimethyl borate with the chloride of a metal selected from Ti(IV), Zr(IV) and Hf(IV), and (1) a polymer of ethylene imine having a molecular weight between about 600 and 100,000 or (2) the reaction product of ethylene oxide with a polyethylenimine having a molecular weight between about 40,000 and 60,000 (PEI–600E). These solutions are useful for coating various anionic materials, such as glass, clay, silica, cellulose and leather, to improve the adhesion of these materials to polymeric materials, such as epoxy resins, polyester resins, rubber and the like. Rubber reinforcing clays show a marked improvement in their rubber reinforcing qualities when treated with these solutions.

The preparation of the reaction products of trimethyl borate with the chlorides of Ti(IV), Zr(IV) and Hf(IV) used in the present invention is described in my copending application Ser. No. 670,419, filed Sept. 25, 1967 now U.S. Patent No. 3,455,976. The method comprises reacting anhydrous trimethyl borate with an anhydrous tetrachloride of titanium, zirconium or hafnium in an inert anhydrous solvent, such as methylene chloride, chloroform, carbon tetrachloride, or an excess of anhydrous trimethyl borate. When the evolution of methyl chloride ceases, the reaction is essentially complete. By evaporating the solvent or excess trimethyl borate from the reaction mixture, the solid product is obtained. At least 0.33 mole of trimethyl borate is used for each mole of the metal chloride. The composition varies with the molar ratio of the reactants. Elemental analysis indicates that from 1 to about 2 moles of trimethylborate will react with one mole of the metal chloride. These reaction products are of unknown complex chemical structure and are believed polymeric and are soluble in water as well as organic solvents, such as methylene chloride, chloroform, carbon tetrachloride, acetone, and glycol ethers.

The polymers of ethylene imine used in the practice of the present invention have a molecular weight between about 600 and about 100,000, the nitrogen atoms being separated by not more than two carbon atoms and the primary, secondary and tertiary imine nitrogen ratio being about 1 to 2 to 1, respectively. These polymers are manufactured by the Dow Chemical Company and sold under the trademark "PEI–6, –18, –600." PEI–6 has a molecular weight of 600; PEI–18 has a molecular weight of 1800; and PEI–600 has a molecular weight from 40,000 to 60,000. In the following description these compounds are referred to as PEI compounds since in the practice of the invention they act as substantial equivalents.

"PEI–600E" is the Dow Chemical Company's trademark designation for hydroxyethylated polyethylenimine (40,000–60,000 molecular weight) to give essentially complete conversion of all amine groups within the polymer to tertiary amines. The resultant modified polymer contains approximately equivalent amounts of hydroxyl and tertiary amine groups. It is supplied as a 40% aqueous solution. This product also is used in the practice of the present invention. In the following description this compound is referred to either as "PEI–600E," hydroxyethylated polyethylenimine, or as the reaction product of ethylene oxide with a polyethylenimine having a molecular weight between about 40,000 and about 60,000.

In the practice of the invention I prefer to employ a reaction product of trimethyl borate and the chloride of the selected metal prepared using the maximum amount of trimethyl borate. In forming the aqueous solutions of these reaction products and the polyethylene polymer, equal weight percent of each is preferred. There is no benefit in the use of more than about 1 weight percent of either.

The invention is illustrated further by the following specific examples.

EXAMPLE 1

A 500 ml., three-neck flask was fitted with a water-cooled reflux condenser which, in turn, was connected to a Dry Ice-acetone cooled condenser and trap. A thermometer and dropping funnel were also fitted to the reaction flask. Stirring was accomplished with a magnetic stirrer.

To the flask was charged 200 grams of redistilled methylene chloride and 69 grams (0.66 mole) of anhydrous B (OCH$_3$)$_3$. To the dropping funnel was charged 5617 grams (0.33 mole) of anhydrous TiCl$_4$. The TiCl$_4$ was added to the flask over a period of 5 minutes with the formation of bright yellow solids. The temperature rose from 22 to 45° C. spontaneously. Then, after 10 minutes of stirring, CH$_3$Cl started to evolve, along with a small amount of unidentified volatile material, which fumed in moist air and gave a positive test for boron.

After 40 minutes, the evolution of volatiles ceased and the reaction was essentially complete. The yellow solids had darkened and mostly dissolved. Methylene chloride was removed by vacuum evaporation. As the methylene chloride was removed, the product which came out appeared to be a polymer, went through a very viscous liquid phase, then a taffy-like semi-solid stage, and finally hardened into a glassy solid. This could easily be broken up into a light yellow powder. Recovery of solids was 77 grams. About 25 grams of volatile products, consisting mainly of CH$_3$Cl as identified by infrared spectrographic techniques, were recovered.

Elemental analysis of the product showed Ti=18.5%, B=6.8%, C=18.6%, H=3.8%, Cl=25.7%; Ti/B ratio 1/116.

EXAMPLE 2

86.5 grams (0.5 mole) of trimethoxyboroxine was dissolved in 200 grams of methylene chloride. To this was added, with stirring, 47.5 grams (0.25 mole) of TiCl$_4$ over a period of about 43 minutes. The reaction mixture was refluxed at 40–45° C. for about two hours. Methyl chloride was evolved during the run. The product was isolated by vacuum evaporation of the methylene chloride. There was recovered 117 grams of yellow solid product. Analysis of the product showed the following:
Ti=10.6%, Cl=14.2%, B=14.0%, $OCH_3$=28%.

EXAMPLE 3

Using the same apparatus described in Example 1, the following experiment was carried out using $Z_1C_4$ in place of $TiCl_4$.

To the reaction flask was charged 200 grams of dry $CH_2Cl_2$ and 62.5 grams (0.27 mole) of $ZrCl_4$. This slurry was stirred with a magnetic stirrer. Then from a dropping funnel was added 104 grams (1.0 mole) of pure methyl borate. With the initial addition of methyl borate, heat was evolved and when about half of the methyl borate had been added, the temperature had increased from 24° C. to 38° C. After about half of the methyl borate was added, methyl chloride started to evolve and was condensed out in the Dry-Ice condenser. After all of the methyl borate was added, the reaction mixture was refluxed for 30 minutes to complete the reaction. Then, the methylene chloride and excess methyl borate were distilled off and the remaining liquids removed by heating under vacuum over night. There was recovered about 96 grams of white solids. Elemental analysis of this product showed Zr=25.6%, B=4.7%, C=17.1%, H=4.01%, Cl=31.0%.

EXAMPLE 4

Aqueous solutions of various PEI compounds were prepared. Aqueous solutions of the complex reaction product of $TiCl_4$ and $B(OCH_3)_3$ prepared as described in Example 1 were prepared. Aliquot portions of these solutions were mixed to give the final concentrations noted in the table below. In no case did coagulation of the resin, or precipitation of the metal (as oxide or hydroxide) occur, showing that very stable water soluble complexes are formed in the pH range of 1–9. Furthermore, those solutions which contain at least 1 part PEI (100% solids basis) to 1 part of the above complex reaction product can be further treated with $NH_4OH$ to give a pH of 10 without precipitation.

| Percent complex reaction product of Example 1 | 1.0 | 1.0 | 0.5 | 1.0 | 0.5 | 0.5 | 0.5 |
|---|---|---|---|---|---|---|---|
| Percent PEI (6, 18, 600) (100% solids) | 0.3 | 0.6 | 0.3 | 1 | 0.6 | 1.0 | 0.1 |
| Approximate pH of solution | 3 | 6 | 6 | 8 | 8.5 | 9 | 1 |

EXAMPLE 5

Aqueous solutions of the various PEI polymers were prepared. Aqueous solutions of the complex reaction product of $ZrCl_4$ and $B(OCH_3)_3$ were prepared as described in Example 3. Aliquot portions of these solutions were mixed to give the final concentrations noted in the table below. Note that in contrast to the previous example any solutions which resulted in a pH higher than about 2 caused precipitation of the zirconium. However, these solutions of pH of about 2 or lower have considerable utility as shown in later examples.

| Percent complex reaction product of Example 3 | 1.0 | 0.5 | 1.0 | 1.0 | 1.0 | 1.0. |
|---|---|---|---|---|---|---|
| Percent PEI (6, 18, 600)(100% solids) | 2.5 | 2.5 | 1.0 | 0.5 | 0.25 | 0.1. |
| Approximate pH of solution (ppt.) | 10 | 9.5 | 7.0 | 3 (slight) | 2 (no) | <2 (no). |

EXAMPLE 6

The following solutions of the complex reaction product of $TiCl_4$ and $B(OCH_3)_3$ prepared as described in Example 1 were prepared. Aqueous solutions of PEI–600E (hydroxyethylated polyethylenimine) were prepared. Aliquot portions of these solutions were mixed to give the final concentrations noted in the table below. No precipitation of the metal as oxide or hydroxide occurred and no coagulation or gelation of the resin occurred.

| Percent complex reaction product of $TiCl_4$ and $B(OCH_3)_3$ | 1.0 | 0.5 | 1.0 | 1.0 | 1.0 |
|---|---|---|---|---|---|
| Percent PEI–600E (100% solids) | 2.0 | 2.0 | 1.0 | 0.4 | 0.04 |
| Approximate pH of solution | 7 | 8 | 5 | 2 | <2 |

EXAMPLE 7

Solutions were prepared as in Example 6 except that the complex reaction product of Example 3 [$TiCl_4$ with $B(OCH_3)_3$] was used. Aliquot portions of these solutions were mixed to give the final concentrations noted in the table below.

| Percent complex of $ZrCl_4$ with $B(OCH_3)_3$ | 1.0 | 0.5 | 1.0 | 1.0 | 1.0 | 1.0 |
|---|---|---|---|---|---|---|
| Percent PEI–600E (100% solids) | 2.0 | 2.0 | 1.0 | 0.4 | 0.1 | 0.04 |
| Approximate pH of solution | ¹7 | ¹8 | ²5 | ²2 | ²1 | ²1 |

¹ (Colloidal haze).
² (No precipitate).

Note that almost no precipitation of Zr oxide or hydroxide occurred when these solutions were prepared in spite of the relatively high pH of these solutions. However, attempts to raise the pH with $NH_4OH$ always caused some gelatinous precipitate to form.

EXAMPLE 8

1 gram of the powdered product obtained in Example 1 Reaction Product of $TiCl_4$ with $B(OCH_3)_3$ was dissolved in 50 ml. of water. 2.5 grams of PEI–18, (MW=1800)

was dissolved in 50 ml. of water. The two solutions were mixed to give a solution containing 1% of the complex reaction product of $TiCl_4$ with $B(OCH_3)_3$ and 2.5% of PEI–18. pH of this solution was about 9. No precipitation occurred when the two solutions were mixed. pH of the mixed solutions was raised to 10 with $NH_4OH$. No precipitation occurred. Similar results were obtained when PEI–6 (MW 600) and PEI–600 (MW 40,000–60,000) were substituted for PEI–18. These solutions were coated on heat cleaned fibre glass fabric and dried at 300–350° C. Permanent bonding of the PEI polymer to the glass substrate was achieved. This was demonstrated by vat dyeing the treated glass fabric with a reduced vat dye (Vat green B). An excellent dyeing was obtained. The dye was not removed by washing 45 minutes in a 0.5% solution of detergent ("Tide") at 120° F. Similar results were obtained where the reactions product of Example 2 ($TiCl_4$ with trimethoxyboroxine) was substituted for the reaction product of Example 1 [$TiCl_4$ with $B(OCH_3)_3$] and a lower alcohol such as methanol, ethanol, isopropanol and butanol were substituted for water in these systems. Where these complex reaction products were omitted from the formulations and only the PEI polymer were coated on the fibre glass fabric and then dyed, only light dyeings were obtained. Almost all of this dye and the PEI polymer were removed by washing for 45 minutes in a 0.5% solution of detergent ("Tide") at 120° F.

EXAMPLE 9

An aqueous solution containing 0.5% of the complex reaction product of Example 1 $TiCl_4$ with $B(OCH_3)_3$ and 0.1% of Dow PEI–600E (hydroxyethylated polyethylenimine) was prepared. The pH of this solution was 1. This solution was coated onto heat cleaned fibre glass, squeezed to about 100% pickup and dried by ironing at about 350° F. for 1 minute. Excellent vat dyeing of this treated glass fabric was obtained which resisted removal by standard wash tests. Equally good results were obtained using methanol as the solvent rather than water.

EXAMPLE 10

An aqueous solution was prepared containing 1% of the complex reaction product of Example 3 [$TiCl_4$ with B (OCH$_3$)$_3$] and 0.25% of PEI–600E. pH of this solution was about 1. This was coated onto heat cleaned fibre glass fabric and vat dyed with Vat green B. A heavier dyeing than that obtained in Example 9 was obtained which was not removed by standard washing tests.

EXAMPLE 11

An aqueous solution was prepared which contained 0.5% of the complex reaction product of Example 1 TiCl$_4$ with B (OCH$_3$)$_3$ and 0.1% of PEI–600 (100% resins basis). This solution was coated onto heat cleaned glass tape ½ inch wide and dried at about 212° C. for 1 minute. This tape was then coated with a resorcinol-formaldehyde latex commonly used to promote adhesion of glass to rubber. The treated tape was vulcanized to a tread stock rubber compound. Outstanding adhesion was obtained. Pull tests showed that a force of 47.1 lbs. was required to tear the rubber from the tape. Failure occurred in the vulcanized rubber matrix not at the tape-rubber interface. Equally good results were obtained where the complex reaction products of Examples 2 and 3 were substituted for the complex reaction product of Example 1 in these tests. Likewise, PEI–18 can be substituted for PEI–600. Slightly lower values, but still within the acceptable range, were obtained when PEI–6 was used in these tests. Methanol, ethanol, isopropanol and butanol were substituted for water with equally good results.

Rubber reinforcing clays treated with these same solutions showed market improvement in their rubber reinforcing qualities, 300% modulus was doubled and Tensile/ Elongation strength was increased 26% over the untreated clays when used in a "Natsyn 400" recipe at 75 phr. clay.

EXAMPLE 12

A pigment-binder dye liquor was prepared which contained 6% by volume of a carboxylic-acrylate resin emulsion "Racryl 335" (RA Chemical Corporation), 3% by volume of a phthalocyanine blue pigment, "Padd Blue 2G" (Interchemical Corporation), 0.5% by weight of the complex reaction product of Example 1, and 0.1% of PEI–18. pH of this system was about 1. This liquor was padded onto heat cleaned fibre glass fabric, dried and cured at 350° F. for 2 minutes. An excellent dyeing was obtained. No loss of dye was noted when the fabric was washed in 0.5% detergent solution "Tide," for 45 minutes at 120° F. Equally good results were obtained when the complex reaction products of Examples 2 and 3 were substituted for the complex reaction product of Example 1. In similar tests where these complex reaction products were omitted from the dye liquor, a marked coagulation of the dye-binder system occurred making the dyeing of very poor quality and of poor wash fastness.

I claim:
1. A solution in a solvent selected from the group consisting of water, and an alcohol containing not more than four carbon atoms, of the complex reaction product of trimethyl borate with a chloride of a metal selected from the group consisting of Ti (IV), Zr (IV) and Hf (IV), and a compound selected from the group consisting of (1) a polymer of ethylene imine having a molecular weight between about 600 and about 100,000, and (2) a second reaction product comprising the reaction product of ethylene oxide with a polyethylenimine having a molecular weight between about 40,000 and about 60,000, substantially all the amine groups of said second reaction product being tertiary amine groups and having hydroxyl groups in an amount approximately equivalent to the tertiary amine groups.
2. An aqueous solution of the complex reaction product of trimethyl borate with the chloride of a metal selected from the group consisting of Ti (IV), Zr (IV) and Hf (IV), and a compound selected from the group consisting of (1) a polymer of ethylene imine having a molecular weight between about 600 and about 100,000, and (2) a second reaction product comprising the reaction product of ethylene oxide with a polyethylenimine having a molecular weight between about 40,000 and about 60,-000, substantially all the amine groups and having hydroxyl groups in amount approximately equivalent to the tertiary amine groups.
3. An anionic substraate coated with the solution as claimed by claim 2 after drying.
4. An aqueous solution as claimed by claim 2 wherein the chloride of the selected metal is titanium tetrachloride.
5. An aqueous solution as claimed by claim 2 wherein the chloride of the selected metal is zirconium tetrachloride.
6. An anionic substrate coated with the solution as claimed by claim 4 after drying.
7. An anionic substrate coated with the solution as claimed by claim 5 after drying.
8. An aqueous solution of the complex reaction product of trimethyl borate with the chloride of a metal selected from the group consisting of Ti (IV), Zr (IV) and Hf (IV), and a polymer of ethylene imine having a molecular weight between about 40,000 and about 60,000 and in which the nitrogen atoms are separated by not more than two carbon atoms and the primary, secondary and tertiary imine nitrogen ratio is about 1 to 2 to 1, respectively.
9. An anionic substrate coated with the solution as claimed by claim 8 after drying.
10. An aqueous solution as claimed by claim 8 wherein the chloride of the selected metal is titanium tetrachloride.
11. An aqueous solution as claimed by claim 8 wherein the chloride of the selected metal is zirconium tetrachloride.
12. An anionic substrate coated with the solution as claimed by claim 10.
13. An anionic substrate coated with the solution as claimed by claim 11.
14. An aqueous solution of the complex reaction product of trimethyl borate with the chloride of a metal selected from the group consisting of Ti (IV), Zr (IV) and Hf (IV), and a second reaction product comprising the reaction product of ethylene oxide with a polyethylenimine having a molecular weight between about 40,000 and about 60,000, substantially all the amine groups of said reaction product being tertiary amine groups and having hydroxyl groups in amount approximately equivalent to the tertiary amine groups.
15. An anionic substrate coated with the solution as claimed by claim 14 after drying.
16. An aqueous solution as claimed by claim 14 wherein the chloride of the selected metal is titanium tetrachloride.
17. An anionic substrate coated with the solution as claimed by claim 14 after drying.
18. An aqueous solution as claimed by claim 14 wherein the chloride of the selected metal is zirconium tetrachloride.
19. An anionic substrate coated with the solution as claimed by claim 18.

References Cited

UNITED STATES PATENTS

| | | | |
|---|---|---|---|
| 3,297,476 | 1/1967 | Kane | 260—29.2 |
| 3,450,658 | 6/1969 | Morison | 260—29.2 |
| 3,455,976 | 7/1969 | Wade | 260—91.5 |

JULIUS FROME, Primary Examiner

A. H. KOECKERT, Assistant Examiner

U.S. Cl. X.R.

8—34; 117—126, 142; 156—331; 161—93, 193; 260—2, 33.4, 41.5, 823